(12) United States Patent
Vadlamudi et al.

(10) Patent No.: US 10,570,883 B2
(45) Date of Patent: Feb. 25, 2020

(54) SYSTEM AND METHOD FOR PROTECTING WIND TURBINES DURING WIND GUSTS

(71) Applicant: General Electric Company, Schenectady, NY (US)

(72) Inventors: Venkata Krishna Vadlamudi, Bangalore (IN); Prashanth Kumar Reddy Vaddi, Bangalore (IN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/851,887

(22) Filed: Dec. 22, 2017

(65) Prior Publication Data

US 2019/0195199 A1 Jun. 27, 2019

(51) Int. Cl.
 *F03D 7/04* (2006.01)
 *F03D 7/02* (2006.01)

(52) U.S. Cl.
 CPC ........... *F03D 7/048* (2013.01); *F03D 7/0268* (2013.01); *F05B 2270/107* (2013.01); *F05B 2270/3201* (2013.01); *F05B 2270/322* (2013.01)

(58) Field of Classification Search
 CPC .. F03D 7/048; F03D 7/0268; F05B 2270/107; F05B 2270/3201; F05B 2270/322
 See application file for complete search history.

(56) References Cited

U.S. PATENT DOCUMENTS

| 8,587,142 B2* | 11/2013 | Kang | F03D 7/048 290/44 |
| 8,810,055 B2* | 8/2014 | Mascarell | F03D 7/0276 290/44 |
| 2003/0160457 A1* | 8/2003 | Ragwitz | F03D 7/043 290/44 |
| 2011/0064573 A1* | 3/2011 | Viripullan | F03D 7/024 416/1 |
| 2012/0009062 A1 | 1/2012 | Ingram et al. | |
| 2013/0144449 A1 | 6/2013 | Dalsgaard et al. | |

(Continued)

FOREIGN PATENT DOCUMENTS

| DE | 10 2010 063396 A1 | 6/2012 |
| EP | 2 154 362 A1 | 2/2010 |

(Continued)

OTHER PUBLICATIONS

European Search Report, dated May 5, 2019.

*Primary Examiner* — Jennifer L Norton
(74) *Attorney, Agent, or Firm* — Dority & Manning, P.A.

(57) ABSTRACT

A system and method for protecting a wind turbine from extreme wind gusts includes monitoring a wind speed and a wind direction at the wind turbine. The method also includes determining a wind gust threshold, wherein wind speeds and wind directions exceeding the wind gust threshold, respectively, are indicative of an extreme wind gust occurring at the wind turbine. In addition, the method includes comparing, via a controller, the monitored wind speed or a function thereof and the wind direction or function thereof to the wind gust threshold, respectively. Thus, the method includes implementing, via a controller, a corrective action when the monitored wind speed and the monitored wind direction exceed the wind gust threshold, respectively.

14 Claims, 5 Drawing Sheets

(56) References Cited

U.S. PATENT DOCUMENTS

| | | | |
|---|---|---|---|
| 2015/0056072 A1* | 2/2015 | Perley | F03D 7/0288 |
| | | | 416/1 |
| 2015/0355044 A1* | 12/2015 | Cardinal | G01M 1/22 |
| | | | 73/455 |
| 2016/0153425 A1 | 2/2016 | Torbohm et al. | |
| 2016/0084224 A1* | 3/2016 | Tyber | F03D 7/048 |
| 2016/0146189 A1* | 5/2016 | Cook | F03D 7/047 |
| | | | 416/1 |
| 2017/0356421 A1* | 12/2017 | Petitjean | F03D 7/048 |
| 2019/0155235 A1* | 5/2019 | Qvist | H04L 41/0896 |
| 2019/0178229 A1* | 6/2019 | Giertz | F03D 7/047 |

FOREIGN PATENT DOCUMENTS

| | | | | |
|---|---|---|---|---|
| EP | 2 527 646 A2 | 11/2012 | | |
| EP | 3382197 A1 * | 10/2018 | | F03D 7/0276 |
| WO | WO 2015/085465 A1 | 6/2015 | | |

* cited by examiner

SYSTEM AND METHOD FOR PROTECTING WIND TURBINES DURING WIND GUSTS

FIELD

The present invention relates generally to wind turbines, and more particularly, to systems and methods for protecting wind turbines during extreme wind gusts.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and a rotor. The rotor typically includes a rotatable hub having one or more rotor blades attached thereto. A pitch bearing is typically configured operably between the hub and the rotor blade to allow for rotation about a pitch axis. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

A power output of the generator increases with wind speed until the wind speed reaches a rated wind speed for the turbine. At and above the rated wind speed, the generator operates at a rated power. The rated power is an output power at which the generator can operate with a level of fatigue or extreme load to turbine components that is predetermined to be acceptable. At wind speeds higher than a certain speed, typically referred to as a "trip limit" or "monitor set point limit," the wind turbine may implement a control action, such as shutting down or de-rating the wind turbine in order to protect wind turbine components from damage.

At times, wind turbines may experience sudden change in wind speed or wind direction or sudden changes in wind speed and wind direction simultaneously due to stochastic nature of wind. Sudden changes in wind speed or wind direction causes extreme loading on the wind turbine. In order to minimize the impact of extreme loads on the wind turbine, conventional protection control schemes shut down the wind turbine when the change in the wind direction exceeds predetermined threshold limits.

Conventional protection control schemes can lead to a large number of trips in the field, which impacts the availability of the wind turbine to produce power. Such control schemes can also cause higher than normal operation extreme loading on various wind turbine components.

Accordingly, systems and methods for protecting wind turbines during extreme wind gusts or for early detection of extreme wind gusts so as to reduce the shut down time and/or reduce the number of trips associated with conventional control schemes would be desired in the art.

BRIEF DESCRIPTION

Aspects and advantages of the invention will be set forth in part in the following description, or may be obvious from the description, or may be learned through practice of the invention.

In one aspect, the present disclosure is directed to a method for protecting a wind turbine from wind gusts. The method includes monitoring a wind speed at the wind turbine. The method also includes monitoring a wind direction at the wind turbine. Further, the method includes determining a wind gust threshold, wherein wind speeds and wind directions exceeding the wind gust threshold are indicative of an extreme wind gust (i.e. a wind speed gust and/or a wind direction gust) occurring at the wind turbine. In addition, the method includes comparing the monitored wind speed or a function thereof and the wind direction or function thereof to the wind gust threshold, respectively. Thus, the method includes implementing, via a controller, a corrective action when the monitored wind speed and the monitored wind direction both exceed the wind gust threshold.

In one embodiment, the method may include monitoring the wind speed and the wind direction simultaneously.

In another embodiment, the method may include filtering at least one of the wind speed or the wind direction. More specifically, in one embodiment, the method may include filtering the wind speed via a band pass filter and/or a low pass filter. Similarly, the method may include filtering the wind direction via a band pass filter and/or a low pass filter.

In certain embodiments, the step of comparing the wind speed and the wind direction to the wind gust threshold, respectively, may include filtering the wind speed and the wind direction via a band pass filter, dividing the filtered wind direction by two to obtain a divided value, determining a sine of the divided value to obtain a sine value, determining an absolute value of the sine value, multiplying the sine value by the filtered wind speed to obtain a threshold value, and comparing the threshold value to the wind gust threshold, as an example.

In further embodiments, the method may include monitoring the wind speed and the wind direction via one or more sensors.

In additional embodiments, the method may include determining the wind gust threshold based on wind turbine design calculations.

In several embodiments, the step of implementing the corrective action when the wind speed and the wind direction exceeds the wind gust threshold, respectively, may include, for example, modifying an operational state of the wind turbine by shutting down or tripping the wind turbine, as well as derating the wind turbine.

In another aspect, the present disclosure is directed to a system for protecting a wind turbine from wind gusts. The system includes a plurality of sensors configured to monitor a wind speed and a wind direction at the wind turbine and a processor communicatively coupled to the plurality of sensors. The processor is configured to perform one or more operations, including but not limited to determining a wind gust threshold, wherein wind speeds and wind directions above the wind gust threshold, respectively, are indicative of an extreme wind gust occurring at the wind turbine, comparing the monitored wind speed or a function thereof and the wind direction or function thereof to the wind gust threshold, respectively, and implementing a corrective action when the monitored wind speed and the monitored wind direction exceed the wind gust threshold, respectively. The system may also include any of the additional features as described herein.

In yet another aspect, the present disclosure is directed to a method for protecting a wind turbine from wind gusts. The method includes simultaneously monitoring a wind speed and a wind direction at the wind turbine. The method also includes determining a wind gust threshold. The wind gust threshold is indicative of an extreme wind gust occurring at the wind turbine. Further, the method includes modifying an operational state of the wind turbine only when both the monitored wind speed exceeds the wind gust threshold and the monitored wind direction exceeds the wind gust threshold. The method may also include any of the additional steps and/or features as described herein.

These and other features, aspects and advantages of the present invention will become better understood with reference to the following description and appended claims. The accompanying drawings, which are incorporated in and constitute a part of this specification, illustrate the embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
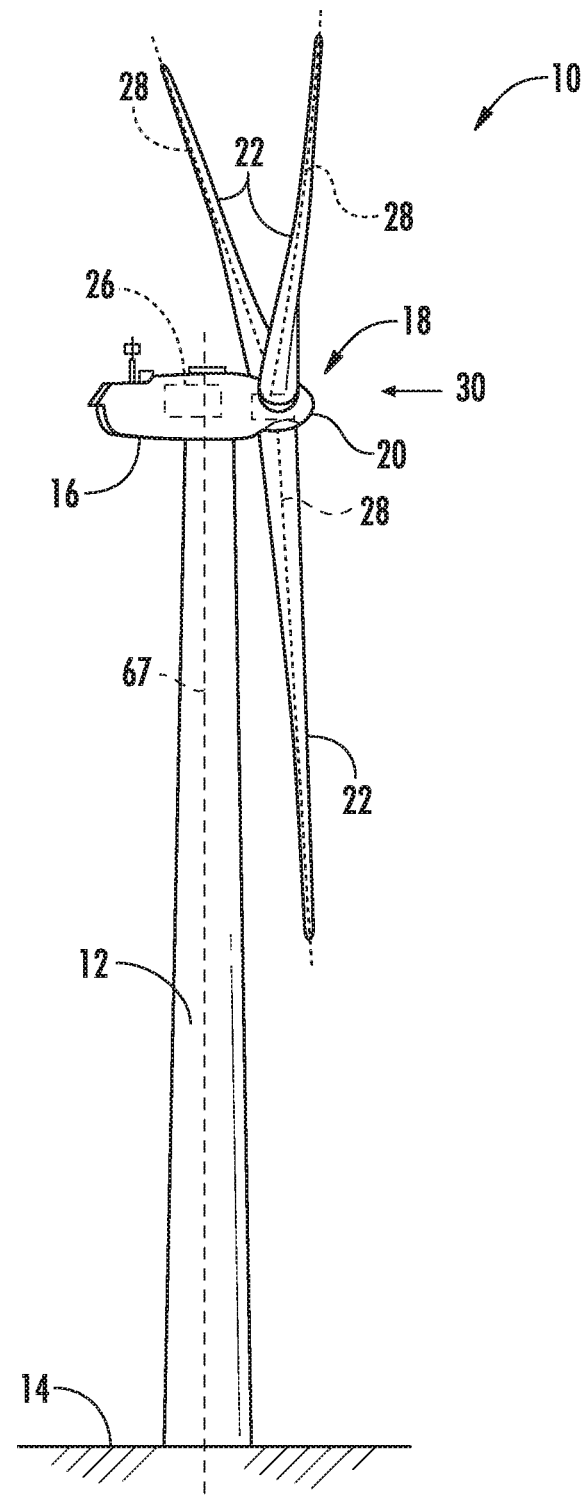
FIG. 1 illustrates a perspective view of one embodiment of a wind turbine according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to the drawings, FIG. 1 illustrates a perspective view of one embodiment of a wind turbine 10 according to the present disclosure. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

The wind turbine 10 may also include a wind turbine controller 26 centralized within the nacelle 16. In other embodiments, the controller 26 may be located within any other component of the wind turbine 10 or at a location outside the wind turbine 10. Further, the controller 26 may be communicatively coupled to any number of the components of the wind turbine 10 in order to control the operation of such components and/or implement a correction action. As such, the controller 26 may include a computer or other suitable processing unit. Thus, in several embodiments, the controller 26 may include suitable computer-readable instructions that, when implemented, configure the controller 26 to perform various different functions, such as receiving, transmitting and/or executing wind turbine control signals. Accordingly, the controller 26 may generally be configured to control the various operating modes (e.g., start-up or shut-down sequences), de-rating or up-rating the wind turbine, and/or individual components of the wind turbine 10.

Figure 2:
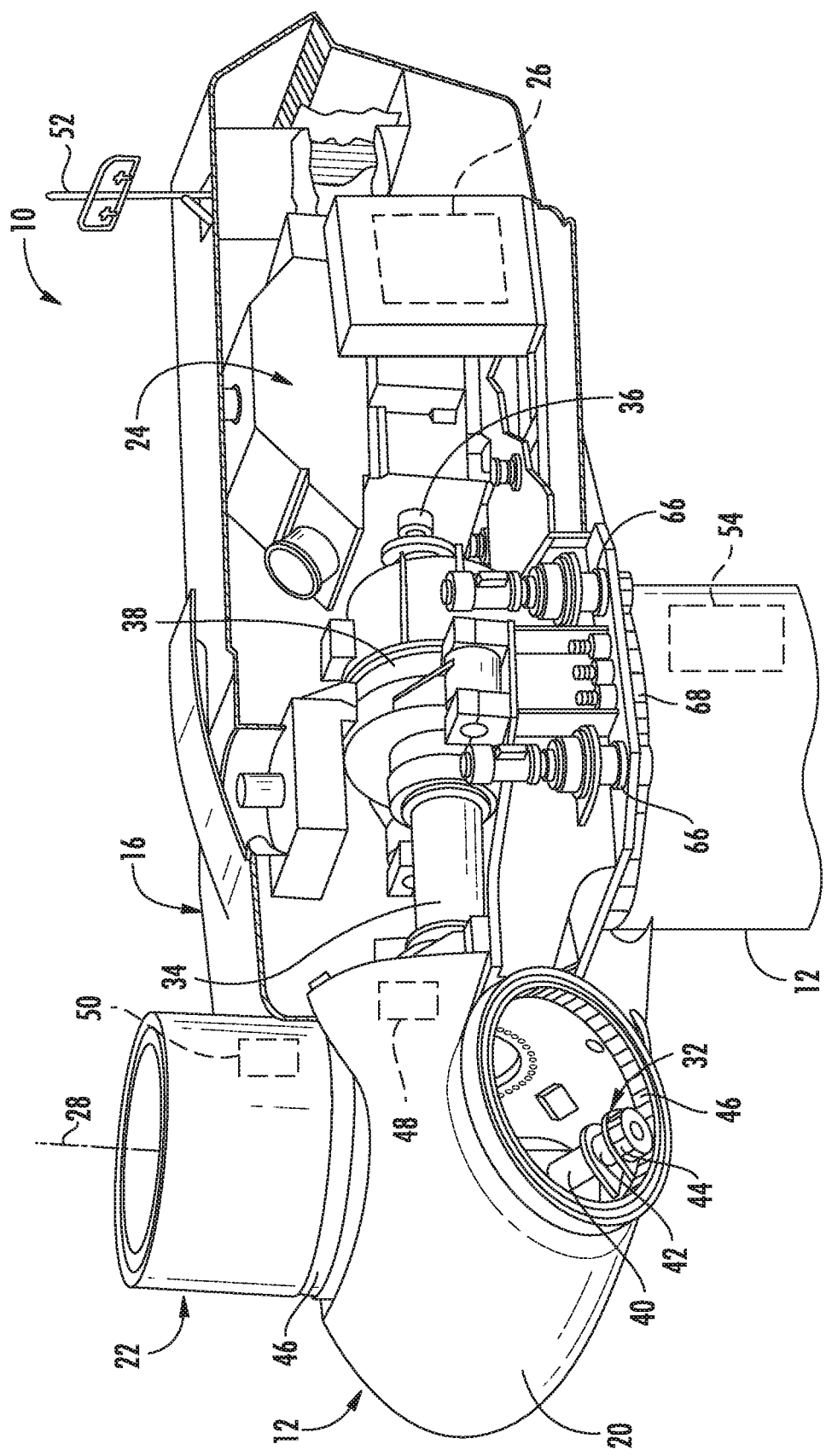
FIG. 2 illustrates a simplified, internal view of one embodiment of a nacelle of a wind turbine.

Referring now to FIG. 2, a simplified, internal view of one embodiment of the nacelle 16 of the wind turbine 10 shown in FIG. 1 is illustrated. As shown, a generator 24 may be disposed within the nacelle 16. In general, the generator 24 may be coupled to the rotor 18 for producing electrical power from the rotational energy generated by the rotor 18. For example, as shown in the illustrated embodiment, the rotor 18 may include a rotor shaft 34 coupled to the hub 20 for rotation therewith. The rotor shaft 34 may, in turn, be rotatably coupled to a generator shaft 36 of the generator 24 through a gearbox 38. As is generally understood, the rotor shaft 34 may provide a low speed, high torque input to the gearbox 38 in response to rotation of the rotor blades 22 and the hub 20. The gearbox 38 may then be configured to convert the low speed, high torque input to a high speed, low torque output to drive the generator shaft 36 and, thus, the generator 24.

Still referring to FIG. 2, each rotor blade 22 may also include a pitch adjustment mechanism 32 configured to rotate each rotor blade 22 about its pitch axis 28. Further, each pitch adjustment mechanism 32 may include a pitch drive motor 40 (e.g., any suitable electric, hydraulic, or pneumatic motor), a pitch drive gearbox 42, and a pitch drive pinion 44. In such embodiments, the pitch drive motor 40 may be coupled to the pitch drive gearbox 42 so that the pitch drive motor 40 imparts mechanical force to the pitch drive gearbox 42. Similarly, the pitch drive gearbox 42 may be coupled to the pitch drive pinion 44 for rotation therewith. The pitch drive pinion 44 may, in turn, be in rotational engagement with a pitch bearing 46 coupled between the hub 20 and a corresponding rotor blade 22 such that rotation of the pitch drive pinion 44 causes rotation of the pitch bearing 46. Thus, in such embodiments, rotation of the pitch drive motor 40 drives the pitch drive gearbox 42 and the pitch drive pinion 44, thereby rotating the pitch bearing 46 and the rotor blade 22 about the pitch axis 28. Similarly, the wind turbine 10 may include one or more yaw drive mechanisms 66 communicatively coupled to the controller 26, with each yaw drive mechanism(s) 66 being configured to change the angle of the nacelle 16 relative to the wind direction 30 (e.g., by engaging a yaw bearing 68 of the wind turbine 10 so as to rotate the nacelle about a yaw axis 67 (FIG. 1)).

The wind turbine 10 may also include a sensor system 64 having one or more sensors 48, 50, 52, 54 for measuring various operating and/or wind parameters of or at the wind turbine 10. For example, as shown in FIG. 2, a sensor(s) 48 may be located on the hub 20 so as to measure hub loads of the wind turbine 10. In addition, a sensor(s) 50 may be located on one or more of the rotor blades 22 so as to measure loads thereof. Further, a sensor(s) 54 may be located on the tower 12 of the wind turbine 10 to measure loads thereof. Moreover, the wind turbine 10 may include one or more wind sensors 52 for measuring various wind and/or environmental parameters of the wind turbine 10. For example, such parameter(s) may include wind gusts, wind speed, wind direction, wind acceleration, wind turbulence, wind shear, wind veer, wake, or similar, as well as air density, air moisture, humidity, pressure, temperature, or any other environmental condition.

In alternative embodiments, the sensors 48, 50, 52, 54 may be any other suitable sensors capable of measuring operating and/or wind parameters of the wind turbine 10. For example, the sensors may be accelerometers, pressure sensors, angle of attack sensors, vibration sensors, MIMU sensors, camera systems, fiber optic systems, anemometers, wind vanes, Sonic Detection and Ranging (SODAR) sensors, infra lasers, radiometers, pitot tubes, rawinsondes, other optical sensors, and/or any other suitable sensors. It should be appreciated that, as used herein, the term "monitor" and variations thereof indicates that the various sensors of the wind turbine may be configured to provide a direct measurement of the parameters being monitored or an indirect measurement of such parameters. Thus, the sensors 48, 50, 52, 54 may, for example, be used to generate signals relating to the parameter being monitored, which can then be utilized by the controller 26 to determine the actual condition.

Figure 3:
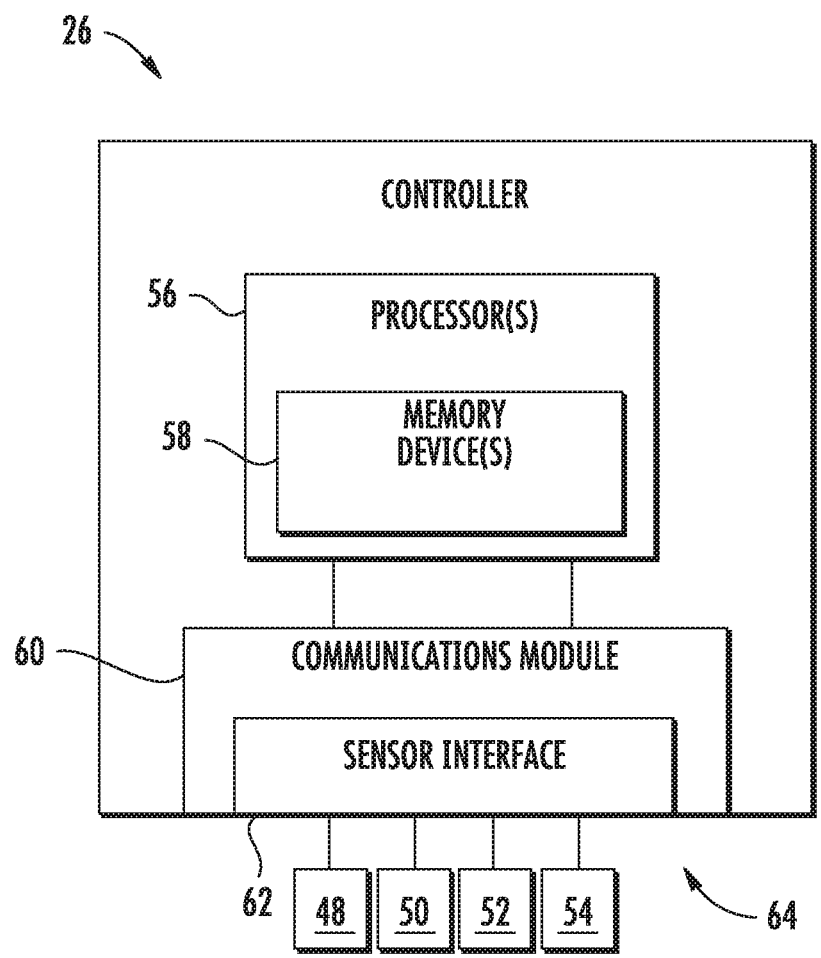
FIG. 3 illustrates a schematic diagram of one embodiment of a controller according to the present disclosure.

Referring specifically to FIG. 3, there is illustrated a block diagram of one embodiment of the controller 26 according to the present disclosure. As shown, the controller 26 may include one or more processor(s) 56 and associated memory device(s) 58 configured to perform a variety of computer-implemented functions (e.g., performing the methods, steps, calculations and the like and storing relevant data as disclosed herein). Additionally, the controller 26 may also include a communications module 60 to facilitate communications between the controller 26 and the various components of the wind turbine 10. Further, the communications module 60 may include a sensor interface 62 (e.g., one or more analog-to-digital converters) to permit signals transmitted from the sensors 48, 50, 52, 54 to be converted into signals that can be understood and processed by the processors 56. It should be appreciated that the sensors 48, 50, 52, 54 may be communicatively coupled to the communications module 60 using any suitable means. For example, as shown in FIG. 3, the sensors 48, 50, 52, 54 are coupled to the sensor interface 62 via a wired connection. However, in other embodiments, the sensors 48, 50, 52, 54 may be coupled to the sensor interface 62 via a wireless connection, such as by using any suitable wireless communications protocol known in the art. As such, the processor 56 may be configured to receive one or more signals from the sensors 48, 50, 52, 54.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 58 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 58 may generally be configured to store suitable computer-readable instructions that, when implemented by the processor(s) 58, configure the controller 26 to perform various functions including, but not limited to, estimating one or more wind parameters of the wind turbine 10 based on the plurality of operating data, transmitting suitable control signals to implement control actions in response to the detection of transient wind conditions and various other suitable computer-implemented functions.

Figure 4:
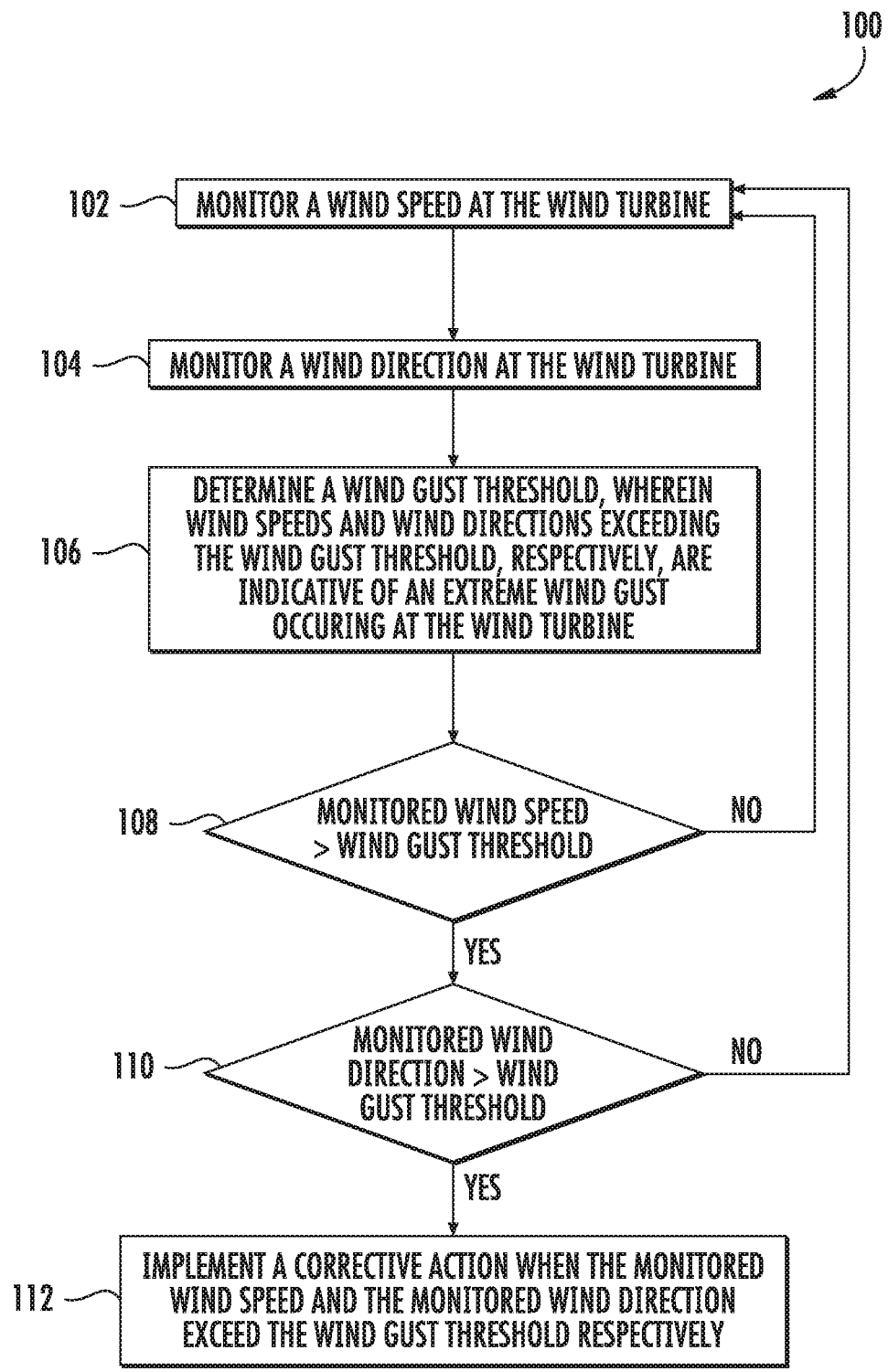
FIG. 4 illustrates a flow diagram of one embodiment of a method for protecting a wind turbine from wind gusts according to the present disclosure.
Figure 5:
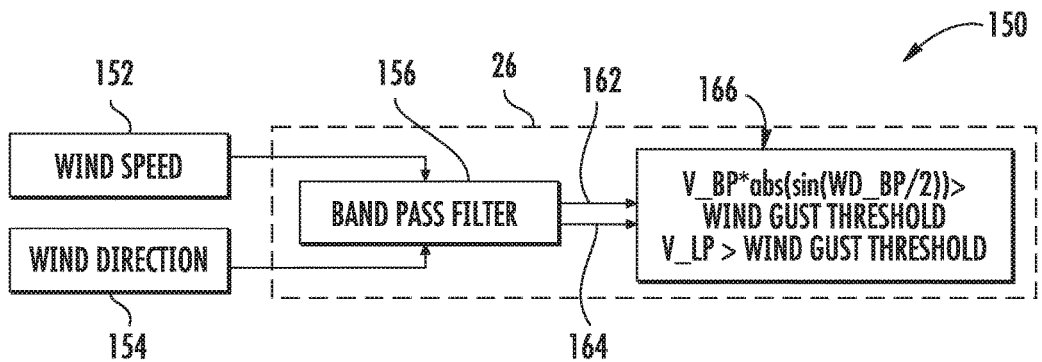
FIG. 5 illustrates a schematic diagram of one embodiment of a system for protecting a wind turbine from wind gusts according to the present disclosure.
Figure 6:
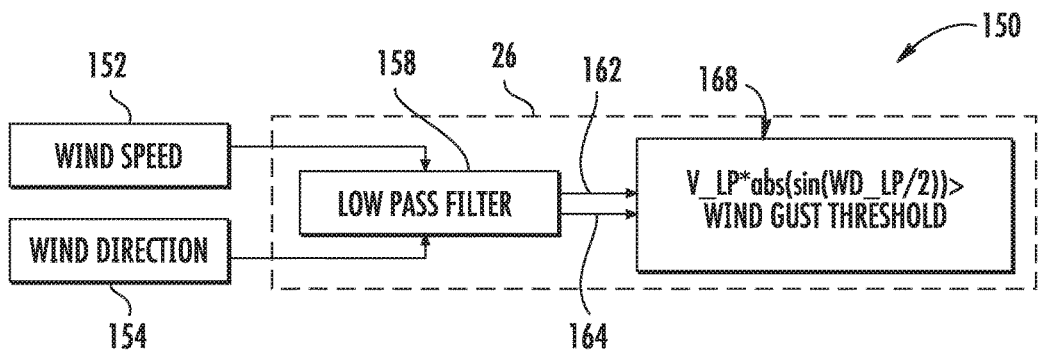
FIG. 6 illustrates a schematic diagram of another embodiment of a system for protecting a wind turbine from wind gusts according to the present disclosure.

Referring now to FIGS. 4-6, a system 150 and method 100 for protecting a wind turbine, such as the wind turbine 10 of FIG. 1, from wind gusts are illustrated. More specifically, FIG. 4 illustrates a flow diagram of the method 100 for protecting the wind turbine 10 from wind gusts; FIG. 5 illustrates a schematic diagram of one embodiment of the system 150 for protecting the wind turbine 10 from wind gusts; and FIG. 6 illustrates a schematic diagram of another embodiment of the system 150 for protecting the wind turbine 10 from wind gusts.

Referring particularly to FIG. 4, as shown at 102, the method 100 includes monitoring a wind speed at the wind turbine 10. As shown at 104, the method 100 also includes monitoring a wind direction at the wind turbine 10. For example, in one embodiment, the method 100 may include monitoring the wind speed and the wind direction simultaneously. In further embodiments, the method 100 may include monitoring the wind speed and the wind direction via one or more of the sensors 48, 50, 52, 54.

As shown at 106, the method 100 also includes determining a wind gust threshold. For example, in one embodiment, the method 100 may include determining the wind gust threshold based on wind turbine design calculations. Thus, wind speeds and wind directions exceeding the wind gust threshold, respectively, are indicative of an extreme wind gust (i.e. a wind speed gust and/or a wind direction gust) occurring at the wind turbine 10. For example, the calculations for thresholds and/or filter constants can be based on loads simulation for lateral wind speeds/wind directions and compared against stress envelopes of wind turbine components. Further, the ability to detect gusts early allows the controller 26 to act and prevent extreme loading. Conservative thresholds accounting for uncertainty in wind speed and/or wind direction measurements can also be calculated, which minimize false positives and overall trips.

In another embodiment, the method 100 may include filtering the wind speed and/or the wind direction. More specifically, as shown in FIGS. 5 and 6, the method 100 may include filtering the wind speed 152 via a band pass filter 154 and/or a low pass filter 158. Similarly, the method 100 may include filtering the wind direction 154 via a band pass filter 156 and/or a low pass filter 158.

Referring back to FIG. 4, as shown at 108, the method 100 also includes comparing, e.g. via the controller 26, the filtered wind speed 162 or a function thereof and the filtered wind direction 164 or a function thereof to the wind gust threshold, respectively. The filtered values can then be used by the controller 26 to determine whether a wind gust is occurring at the wind turbine 10. In one embodiment, the wind speed and the wind direction may be weighted equally by the controller 26. Alternatively, in a preferred embodiment, the wind speed and the wind direction may be weighted differently. In such embodiments, the controller 26 may use a function, such as sine, to change the relative weightage between the two parameters.

More specifically, as shown in FIG. 5, the controller 26 may filter the wind speed 152 and the wind direction 154 via the band pass filter 156. For example, as shown in control module 166, the controller 26 may then divide the filtered wind direction 164 by two to obtain a divided value, determine a sine of the divided value to obtain a sine value, determine an absolute value of the sine value, multiply the sine value by the filtered wind speed 162 to obtain a threshold value, and compare the threshold value to the wind gust threshold, as an example. In such embodiments, the function sin(WD BP/2) gives more weight to low wind directions (e.g. 60 degrees) and less weight to high wind directions (e.g. such as 180 degrees, with sin(WD BP/2) going from 0 to 1 as the wind direction goes from 0 to 180 degrees. Many other functions can also be used.

In addition, functions such as sine and division can be applied before filtering, i.e. a function of the raw wind speed and wind direction can be filtered instead of raw wind speed and wind direction being filtered and then applying the function. Alternatively, as shown in FIG. 6, the controller 26 may filter the wind speed 152 and the wind direction 154 via the low pass filter 156. Thus, as shown in control module 168, the controller 26 may then divide the filtered wind direction 164 by two to obtain a divided value, determine a sine of the divided value to obtain a sine value, determine an absolute value of the sine value, multiply the sine value by the filtered wind speed 162 to obtain a threshold value, and compare the threshold value to the wind gust threshold, as another example.

Accordingly, as shown at 110 of FIG. 4, the method 100 may include implementing a corrective action when the wind speed 152 and the wind direction 154 exceed the wind gust threshold, respectively. For example, in several embodiments, the step of implementing the corrective action when the wind speed 152 and the wind direction 154 exceeds the wind gust threshold, respectively, may include, for example, shutting down or tripping the wind turbine 10, as well as derating the wind turbine 10.

As used herein, derating the wind turbine 10 may include speed de-rating, torque de-rating or a combination of both. Further, the wind turbine 10 may be de-rated by reducing speed and increasing torque, which can be beneficial so as to maintain power. In another embodiment, the wind turbine 10 may be temporarily de-rated by modifying the torque demand on the generator 24. In general, the torque demand may be modified using any suitable method, process, structure and/or means known in the art. For instance, in one embodiment, the torque demand on the generator 24 may be controlled using the controller 26 by transmitting a suitable control signal/command to the generator 24 in order to modulate the magnetic flux produced within the generator 24.

The wind turbine 10 may also be temporarily de-rated by yawing the nacelle 16 to change the angle of the nacelle 16 relative to the direction of the wind 30. In other embodiments, the controller 26 may be configured to actuate one or more mechanical brake(s) or activate an airflow modifying element on a rotor blade in order to reduce the rotational speed and/or load of the rotor blades 14, thereby reducing component loading. In still further embodiments, the controller 26 may be configured to perform any appropriate control action known in the art. Further, the controller 26 may implement a combination of two or more control actions.

Figure 7:
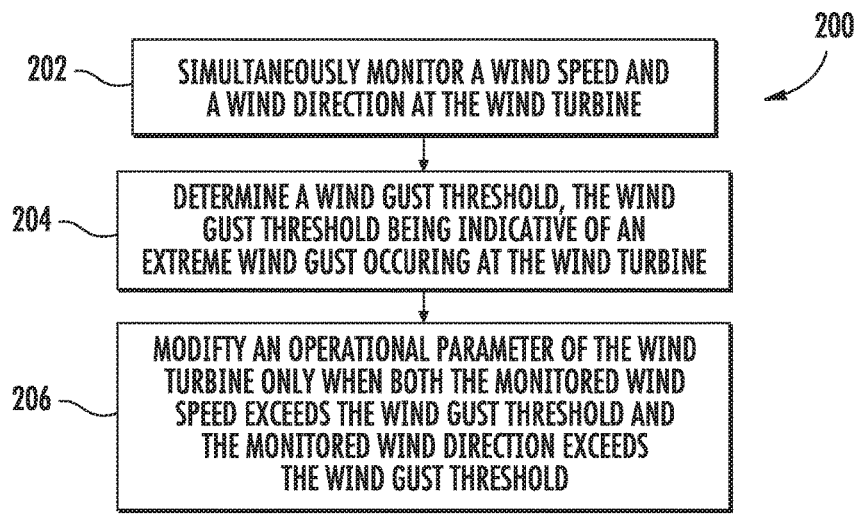
FIG. 7 illustrates a flow diagram of another embodiment of a method for protecting a wind turbine from wind gusts according to the present disclosure.

Referring now to FIG. 7, flow diagram of another embodiment of a method 200 for protecting the wind turbine 10 from wind gusts is illustrated. As shown at 202, the method 200 includes simultaneously monitoring a wind speed and a wind direction at the wind turbine 10. As shown at 204, the method 200 includes determining a wind gust threshold. The wind gust threshold is indicative of an extreme wind gust occurring at the wind turbine 10. As shown at 206, the method 200 includes modifying an operational state of the wind turbine 10 only when both the monitored wind speed exceeds the wind gust threshold and the monitored wind direction exceeds the wind gust threshold. For example, the wind turbine 10 may be tripped, shut down, or derated.

It should also be appreciated that an advantage of the present invention is that the system and method may be implemented using existing components of the wind turbine 10. As such, a user is not required to purchase, install, and maintain new equipment. Further, the controller 26 may be integrated with a broader control system, such as, but not limiting of, a wind turbine control system, a plant control system, a remote monitoring system, or combinations thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for protecting a wind turbine from wind gusts, the method comprising:
   monitoring a wind speed at the wind turbine;
   monitoring a wind direction at the wind turbine;
   filtering the wind speed and the wind direction via one or more filters;
   determining a wind gust threshold, wherein the wind gust threshold is indicative of an extreme wind gust occurring at the wind turbine;
   comparing, via a controller, the filtered wind speed or a function thereof and the filtered wind direction or a function thereof to the wind gust threshold, respectively, wherein comparing the filtered wind speed or the function thereof and the filtered wind direction or the function thereof to the wind gust threshold comprises:
   dividing the filtered wind direction by two to obtain a divided value;
   determining a sine of the divided value to obtain a sine value;
   multiplying the sine value by the filtered wind speed to obtain a threshold value; and
   comparing the threshold value to the wind gust threshold; and
   implementing, via a controller, a corrective action when the threshold value exceeds the wind gust threshold.

2. The method of claim 1, further comprising monitoring the wind speed and the wind direction simultaneously.

3. The method claim 1, wherein the one or more filters comprise of a band pass filter.

4. The method of claim 1, further comprising monitoring the wind speed and the wind direction via one or more sensors.

5. The method of claim 1, further comprising determining the wind gust threshold based on wind turbine design calculations.

6. The method of claim 1, wherein implementing the corrective action further comprises at least one of shutting down the wind turbine or derating the wind turbine.

7. A system for protecting a wind turbine from wind gusts, the system comprising:
- a plurality of sensors configured to monitor a wind speed and a wind direction at the wind turbine;
- one or more filters for filtering the wind speed and the wind direction;
- a processor communicatively coupled to the plurality of sensors, the processor configured to perform one or more operations, the one or more operations comprising:
- determining a wind gust threshold, wherein the wind gust threshold is indicative of an extreme wind gust occurring at the wind turbine;
- comparing the filtered wind speed or a function thereof and the filtered wind direction or a function thereof to the wind gust threshold, respectively, wherein comparing the filtered wind speed or the function thereof and the filtered wind direction or the function thereof to the wind gust threshold comprises:
  - dividing the filtered wind direction by two to obtain a divided value;
  - determining a sine of the divided value to obtain a sine value;
  - multiplying the sine value by the filtered wind speed to obtain a threshold value; and
  - comparing the threshold value to the wind gust threshold; and
- implementing a corrective action when the threshold value exceeds the wind gust threshold.

8. The system of claim 7, wherein the one or more operations further comprise monitoring the wind speed and the wind direction simultaneously.

9. The system of claim 7, wherein the one or more filters comprise of a band pass filter.

10. The system of claim 7, wherein the one or more operations further comprise monitoring the wind speed and the wind direction via one or more sensors.

11. The system of claim 7, wherein the one or more operations further comprise determining the wind gust threshold based on wind turbine design calculations.

12. The system of claim 7, wherein implementing the corrective action further comprises at least one of shutting down the wind turbine or derating the wind turbine.

13. A method for protecting a wind turbine from extreme wind gusts, the method comprising:
- simultaneously monitoring a wind speed and a wind direction at the wind turbine;
- filtering the wind speed and the wind direction via one or more filters;
- dividing the filtered wind direction by two to obtain a divided value;
- determining a sine of the divided value to obtain a sine value;
- multiplying the sine value by the filtered wind speed to obtain a threshold value;
- determining a wind gust threshold, the wind gust threshold being indicative of an extreme wind gust occurring at the wind turbine;
- comparing the threshold value to the wind gust threshold; and
- modifying an operational state of the wind turbine only when the threshold value exceeds the wind gust threshold.

14. The method of claim 13, wherein the one or more filters comprise of a band pass filter.

* * * * *